United States Patent [19]
Den Ouden

[11] 3,763,592
[45] Oct. 9, 1973

[54] ANIMAL WITH HARD AND SOFT BODY PORTIONS SIMULATED BY HARD AND SOFT MOULDINGS

[75] Inventor: Alfons Adriaan Den Ouden, Antwerp, Belgium

[73] Assignee: Brabo Corporation S.A.N.V., Antwerpen, Belgium

[22] Filed: Aug. 24, 1972

[21] Appl. No.: 283,342

[30] Foreign Application Priority Data
Nov. 19, 1971   Great Britain .................... 53,864/71

[52] U.S. Cl. .................................... 46/152, 161/20
[51] Int. Cl. .......................... A63h 3/00, A63h 3/16
[58] Field of Search .................... 46/152, 162, 151, 46/155, 156, 22, 123; 161/20

[56] References Cited
UNITED STATES PATENTS

| | | |
|---|---|---|
| 877,150 | 1/1908 | Whitehead .................. 161/20 X |
| 2,606,398 | 8/1952 | Miller .................................. 46/156 |
| 2,619,257 | 11/1952 | Posner ........................... 46/123 X |
| 2,808,681 | 10/1957 | Arenstein ........................ 46/151 X |

Primary Examiner—F. Barry Shay
Attorney—Donald M. Wight et al.

[57] ABSTRACT

A model of an animal which in nature has a soft body portion and a hard carapace or shell, comprising a hollow first moulding of relatively rigid material, said moulding having an external surface simulating the normally visible portions of the carapace or shell of the animal to be represented and an opening which receives a second moulding of soft resilient material configured to represent the externally visible soft body portions of the animal. The two mouldings may be joined by spigots engaging sockets formed in the second moulding so as to lock the second moulding to the first moulding in a relationship appropriate to the animal being represented.

4 Claims, 3 Drawing Figures

Patented Oct. 9, 1973 3,763,592

ANIMAL WITH HARD AND SOFT BODY PORTIONS SIMULATED BY HARD AND SOFT MOULDINGS

This invention relates to model animals, and more particularly to such animals as have a soft body and a hard carapace or shell, such as tortoises, turtles and snails.

The production of life-like models of such animals presents problems due to the differing hardness characteristics of the carapace or shell and the body portion. A body portion which is reasonably realistic both visually and in feel can be moulded from suitable soft resilient materials, but such materials are of course unsuitable for the shell if this is to have a realistic rigidity. Moreover, a soft body portion cannot readily be satisfactorily moulded into a pre-formed shell so as to provide a composite model.

The object of the present invention is to provide a model of an animal having a soft body portion and a hard carapace or shell whose manufacture overcomes the above difficulty.

According to the invention, a model of an animal which in nature has a soft body portion and a hard carapace or shell comprises a hollow first moulding of relatively rigid material, said moulding having an external surface simulating the normally visible portions of the carapace or shell of the animal to be represented and an opening which receives a second moulding of soft resilient material configured to represent the externally visible portions of the soft body portion of the animal to be represented and a plurality of spigots extending from the internal surface of the first moulding towards said opening, the spigots engaging sockets formed in the second moulding so as to lock the second moulding to the first moulding in a relationship appropriate to the animal being represented.

Although it should be understood that models of other animals, for example turtles or snails, can be constructed in accordance with the invention, the invention will be described further with specific reference to the accompanying drawings of a model tortoise, in which.

Figure 1:
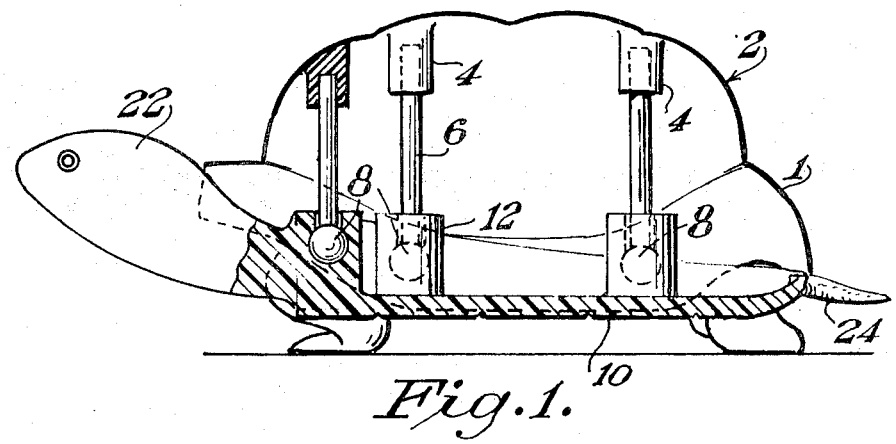
FIG. 1 is a vertical longitudinal section through the model.
Figure 2:
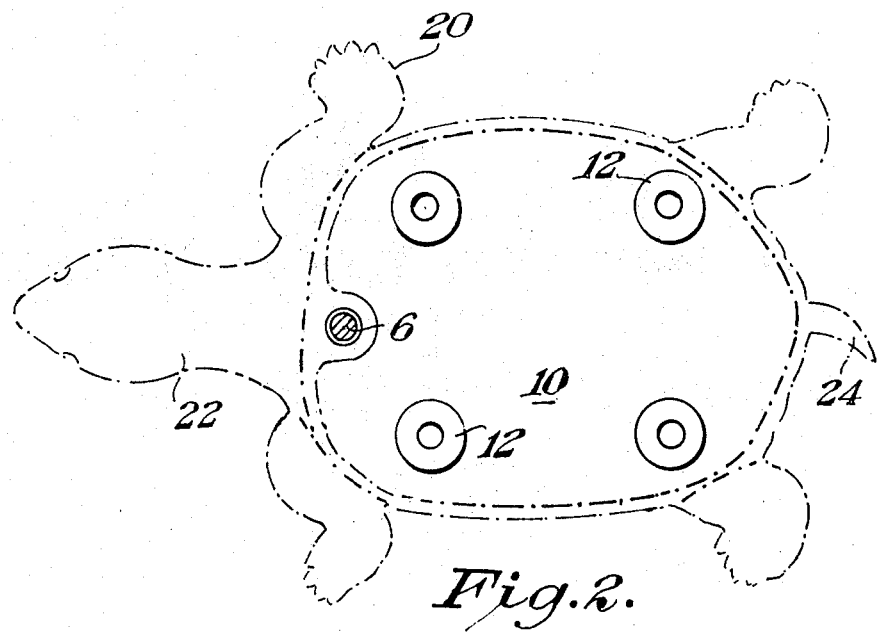
FIG. 2 is a plan view of a moulding forming the body portion of the model.
Figure 3:
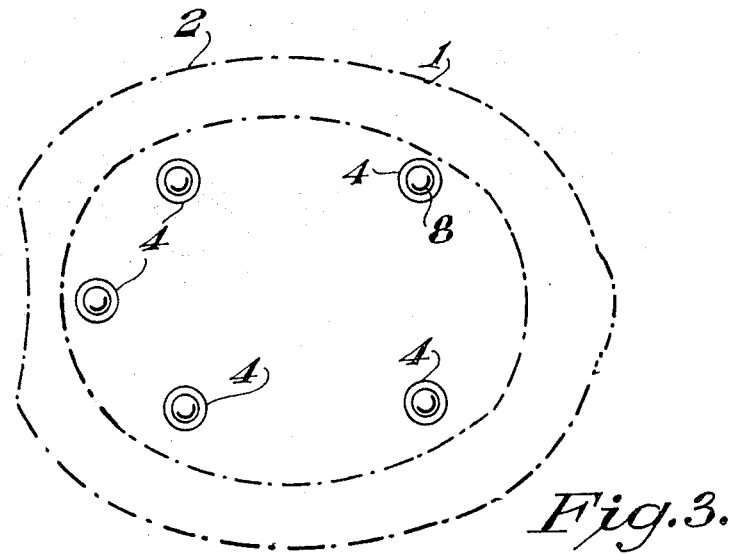
FIG. 3 is an underside view of a moulding forming the shell portion of the model.

Referring to the drawings, it will be seen that the upper shell of a model tortoise is formed as a single moulding 2, preferably an injection moulding, of suitably coloured synthetic plastic material. The synthetic plastic material should be such as to provide a shell which is substantially rigid. On the inside surface of the shell are formed a number, five in the example illustrated, of sockets 4, into which are inserted separately moulded spigots 6 having enlarged heads 8, the arrangement of the sockets 4 being such that the spigots project downwardly from the shell at spaced locations, and enter sockets 12 formed in a second moulding 10 which simulates the body portions of the tortoise. For convenience, the lower shell of the tortoise is also moulded integrally with the body. The material utilised for moulding the body should be soft and resilient, various forms of natural or synthetic rubber being suitable, or alternatively, foamed synthetic plastics having suitable properties, such as foamed polyvinyl chloride. The separate mouldings are formed into a single model by inserting the spigots 6 into the sockets 4 of the moulding 2 and pressing the moulding 10 onto the spigots 6 so that its sockets 12 engage the spigot heads 8, the various parts being dimensioned so that when the moulding 10 is so engaged, its edges mate with the inner surface or peripheral edge 1 of the moulding 2 to give a life-like effect, with the limbs 20, the head 22 and the tail 24 of the body moulding projecting from beneath the shell moulding, as in nature.

The two mouldings may either be painted externally or integrally pigmented, or a combination of both, in order to give a desired life-like effect.

I claim:

1. A model of an animal which in nature has a soft body portion and a hard carapace or shell, comprising, first means including a hollow first moulding of relatively rigid material said first moulding having an external surface simulating the configuration, appearance and hardness of the normally visible portions of the carapace or shell of the animal and second means comprising a second moulding of soft resilient material, said second moulding simulating the configuration, appearance and softness of the externally visible portions of the soft body portions of the animal, said first moulding having an opening which receives said second moulding, and a plurality of spigots extending from the internal surface of the first moulding towards said opening, the spigots engaging sockets formed in the second moulding so as to lock the second moulding to the first moulding in a relationship appropriate to the animal, said mouldings together forming a substantially complete exterior representation of said animal.

2. A model according to claim 1, wherein the spigots are separate mouldings received in sockets moulded into the inner surface of the first moulding.

3. A model according to claim 2, wherein the spigots have enlarged heads.

4. A model according to claim 1, wherein the animal represented is a tortoise, and the under shell of the tortoise is formed as part of the second moulding.

* * * * *